United States Patent
Takami et al.

(10) Patent No.: US 11,261,358 B2
(45) Date of Patent: Mar. 1, 2022

(54) CURABLE COMPOSITION

(71) Applicant: Sunstar Engineering Inc., Osaka (JP)

(72) Inventors: Kazunobu Takami, Osaka (JP);
Takatomi Nishida, Osaka (JP)

(73) Assignee: Sunstar Engineering Inc., Osaka (JP)

( * ) Notice: Subject to any disclaimer, the term of this patent is extended or adjusted under 35 U.S.C. 154(b) by 0 days.

(21) Appl. No.: 16/639,115

(22) PCT Filed: Aug. 3, 2018

(86) PCT No.: PCT/JP2018/029168
§ 371 (c)(1),
(2) Date: Feb. 13, 2020

(87) PCT Pub. No.: WO2019/039230
PCT Pub. Date: Feb. 28, 2019

(65) Prior Publication Data
US 2020/0208029 A1    Jul. 2, 2020

(30) Foreign Application Priority Data

Aug. 22, 2017    (JP) ................ JP2017-159758

(51) Int. Cl.
| *C09J 163/04* | (2006.01) |
| *C08G 59/24* | (2006.01) |
| *C08G 59/50* | (2006.01) |
| *C08G 59/68* | (2006.01) |

(52) U.S. Cl.
CPC .......... *C09J 163/04* (2013.01); *C08G 59/245* (2013.01); *C08G 59/5073* (2013.01); *C08G 59/686* (2013.01)

(58) Field of Classification Search
CPC .. C09J 163/04; C08G 59/245; C08G 59/5073; C08G 59/686
USPC ......................................................... 528/93
See application file for complete search history.

(56) References Cited

U.S. PATENT DOCUMENTS

| 3,928,351 | A | | 12/1975 | Donald | |
| 4,122,128 | A | | 10/1978 | Lehmann et al. | |
| 4,895,702 | A | * | 1/1990 | Fischer | C09K 8/54 |
| | | | | | 252/392 |
| 5,719,320 | A | | 2/1998 | Jinbo | |
| 5,892,111 | A | | 4/1999 | Jinbo | |
| 6,441,064 | B1 | | 8/2002 | Shah et al. | |
| 2002/0010284 | A1 | * | 1/2002 | Nishiguchi | C08G 18/4081 |
| | | | | | 525/403 |
| 2013/0217805 | A1 | * | 8/2013 | Hayashi | C08L 63/00 |
| | | | | | 523/427 |
| 2016/0068627 | A1 | | 3/2016 | Moser et al. | |
| 2017/0158806 | A1 | * | 6/2017 | Peters | C07D 303/18 |

FOREIGN PATENT DOCUMENTS

| JP | 5385832 | | 7/1978 |
| JP | 62265323 | A | 11/1987 |
| JP | 8301836 | | 11/1996 |
| JP | 200410618 | A | 1/2004 |
| JP | 2005264039 | A | 9/2005 |
| JP | 2005314624 | A | 11/2005 |
| JP | 201179942 | A | 4/2011 |
| JP | 2015174967 | A | 10/2015 |
| JP | 201620445 | A | 2/2016 |
| JP | 2016526067 | A | 9/2016 |
| WO | 2013069368 | A1 | 4/2015 |

OTHER PUBLICATIONS

International Search Report for corresponding Application No. PCT/JP2018/029168, dated Oct. 23, 2018.
English translation of International Preliminary Report on Patentability for related International Application No. PCT/JP2018/029168 dated Feb. 25, 2020.
Extended European Search Report and written opinion for corresponding European application No. 18847425.8 dated Mar. 23, 2021.

* cited by examiner

*Primary Examiner* — David T Karst
(74) *Attorney, Agent, or Firm* — Renner, Otto, Boisselle & Sklar, LLP

(57) ABSTRACT

The present invention provides an epoxy resin-based curable composition which may be used as a structural adhesive for an automobile. Particularly, the present invention provides an epoxy resin-based curable composition having excellent low-temperature curability, while maintaining good storage stability and good adhesion.
The present invention relates to a curable composition comprising an epoxy resin, a urea-based curing accelerator (A) and an amine-based curing agent (B) having a pyrazine ring.

4 Claims, No Drawings

CURABLE COMPOSITION

TECHNICAL FIELD

The present invention relates to an epoxy resin-based curable composition having good low-temperature curability, while maintaining good storage stability and good adhesion.

BACKGROUND OF THE INVENTION

One-component type thermally curable adhesives such as an epoxy resin have been used as a structural adhesive for an automobile and have been simultaneously cured during the baking of electrodeposition coating in a manufacturing line for an automobile. The baking has been conventionally conducted at a temperature of 160 to 180° C. for approximately 30 minutes. However, it has been requested to decrease a baking temperature and reduce a baking time in terms of consideration of global environments and reduction of manufacturing costs. In addition, the needs for low-temperature curable adhesives has been increased still more, because it is impossible to ensure a sufficient curability of a conventional adhesive in a lower surrounding part and a overlapped portion of steel sheets of the automobile by increasing an application site of the structural adhesive.

In epoxy resin-based low-temperature curable compositions conventionally used in the art, many combinations between a so-called latent curing agent and curing accelerator have been proposed (Patent Documents 1 to 5). However, particularly among them, good low-temperature curability was obtained by the combination between dicyandiamide as the curing agent and an imidazole compound or a urea-based compound as the curing accelerator, and a method of lowering a reaction temperature between the epoxy resin and dicyandiamide has been performed. However, there have been problems that storage stability as a conflicting performance with the low-temperature curability is reduced; and adhesion is reduced by performing the curing at lower temperature and for shorter time. Thus, there have not been adhesives satisfying all of the low-temperature curability, storage stability and adhesion.

PRIOR ART

Patent Documents

Patent Document 1: JP S62-265323 A
Patent Document 2: JP H8-301836 A
Patent Document 3: JP 2004-10618 A
Patent Document 4: JP 2011-79942 A
Patent Document 5: WO 2013/69368 A1

OBJECTS OF THE INVENTION

An object of the present invention is to solve the above mentioned problems concerning conventional epoxy resin-based low-temperature curable compositions for an automobile and to provide an epoxy resin-based curable composition for an automobile, which has good low-temperature curability, while maintaining good storage stability and good adhesion.

The present inventors have intensely studied solutions for solving the above mentioned problems and have found that it is possible to provide an epoxy resin-based curable composition, which has good low-temperature curability, while maintaining good storage stability and good adhesion by using the specified combinations between the curing accelerator and curing agent. The present invention has been completed based on the above finding.

SUMMARY OF THE INVENTION

The present invention relates to a curable composition comprising an epoxy resin, a urea-based curing accelerator (A) and an amine-based curing agent (B) having a pyrazine ring.

In order to suitably carry out the present invention, it is desired that:

the urea-based curing accelerator (A) is N, N-dimethyl-N'-(3,4-dichlorophenyl) urea;

the amine-based curing agent (B) having a pyrazine ring comprises an amine compound (B-1) having a pyrazine ring, a bisphenol A type epoxy resin (B-2) and a phenol novolac (B-3), and wherein the curable composition has a melting point of 60 to 120° C.;

the amine compound (B-1) having a pyrazine ring has a content of 1 to 20% by mass, based on the mass of the amine-based curing agent (B) having a pyrazine ring; and a mass ratio (NB) of the urea-based curing accelerator (A) to the amine-based curing agent (B) having a pyrazine ring in the curable composition is within the range of 0.1 to 10.

Effects of the Invention

In the epoxy resin-based curable composition of the present invention, it is possible to provide an epoxy resin-based curable composition, of which all of the low-temperature curability, storage stability and adhesion are good by selecting the specified combinations between the curing accelerator and curing agent, that is, by using the urea-based curing accelerator (A) and the amine-based curing agent (B) having a pyrazine ring.

DESCRIPTION OF THE PREFERRED EMBODIMENTS

The curable composition of the present invention comprises an epoxy resin, a urea-based curing accelerator (A) and an amine-based curing agent (B) having a pyrazine ring.

Examples of the epoxy resins used in the curable composition of the present invention include:

bisphenol A type epoxy resins such as diglycidyl ethers of bisphenol A, bisphenol F, brominated bisphenol A and bisphenol AD; and diglycidyl ethers of alkylene oxide adducts of bisphenol A;

acrylonitrile-butadiene copolymer modified epoxy resins prepared by formulating carboxyl-terminated butadiene-acrylonitrile copolymer rubber and bisphenol A type epoxy resin at a mass ratio of 1:5 to 4:1, preferably 1:3 to 3:2 and then reacting them at a temperature of 80 to 180° C.;

alkylene oxide modified diglycidyl ether type epoxy resins prepared by reacting polyhydroxy compounds [such as polyalkylene glycols including polyethylene glycol, polypropylene glycol, polyethylene propylene glycol and the like; aliphatic polyvalent hydroxy compounds including hexylene glycol, butylene glycol, propylene glycol, ethylene glycol, neopentyl glycol, triethylene glycol, pentanediol, hexanetriol, glycerol and the like] with epihalohydrin;

urethane-modified epoxy resins prepared by reacting polyurethane prepolymer, which polyisocyanate is added to a terminal of polyalkylene glycol, with hydroxyl group of epoxy resin (a mixing ratio of 10:90 to 50:50) and acrylic-modified epoxy resins prepared by reacting carboxyl group on the surface of acrylic rubber particles with epoxy resin (a mixing ratio of 10:90 to 50:50). Examples of the epoxy resins commercially available include "jER™ 828", which is commercially available from Mitsubishi Chemical Corporation, "Adeka Resin™ EPR-4023", "Adeka Glycirol™ ED-506", "Adeka Resin™ EPU-73B", which are commercially available from ADEKA Corporation, "Kane Ace™ MX-257", which is commercially available from Kaneka Corporation and the like.

Examples of the urea-based curing accelerators (A) used in the curable composition of the present invention include N, N-dimethyl-N'-(3,4-dichlorophenyl) urea, N, N-dimethyl-N'-phenyl urea, N, N-dimethyl-N'-(4-chlorophenyl) urea, N'-(4-isopropylphenyl)-N, N-dimethyl urea, N, N'-(4-methyl-1,3-phenylene) bis (N',N'-dimethyl urea) and the like. An amount of the urea-based curing accelerator (A) in the curable composition of the present invention is within the range of preferably 0.5 to 10 parts by mass, more preferably 2 to 7 parts by mass, based on 100 parts by mass of the epoxy resin in terms of the curability and storage stability of the epoxy resin. Examples of the urea-based curing accelerators (A) commercially available include "Dyhard® UR200", which is commercially available from AlzChem AG and the like.

Examples of the amine-based curing agents (B) having a pyrazine ring to be used in the epoxy resin curable composition of the present invention include aliphatic amines, alicyclic amines and aromatic amines which have a pyrazine ring, or may be an amine adduct of an epoxy resin and the above amines which has a pyrazine ring. The term "pyrazine ring," as used herein is intended to include a "pyrimidine ring" and "pyridazine ring" as structural isomers, of which the position of the nitrogen atom is different.

Amine-based curing agent s (B) having a pyrazine ring to be used in the epoxy resin-based curable composition of the present invention comprise an amine compound (B-1) having a pyrazine ring and, bisphenol A type epoxy resin (B-2), and a phenol novolac (B-3). Examples of the amine compounds (B-1) having the pyrazine ring include, but are not limited to, for example, amino pyrazine, diaminopyrazine, methylamino pyrazine, methyl diaminopyrazine, ethyl aminopyrazine, 3-aminopyrazine-2-carboxylic acid, and various pyrazine derivatives described in JP 2010-18599 A and the like. As the amine compound (B-1), amine compounds having an active hydrogen equivalent of 20 to 300 g/eq., preferably 50 to 180 g/eq. may be used.

The content of the amine compound (B-1) in the amine-based curing agent (B) is within the range of 1 to 20% by mass, preferably 2 to 15% by mass, more preferably 3 to 10% by mass. When the content of the amine compound (B-1) is not less than 1% by mass, low-temperature curability is excellent. On the other hand, when the content of the amine compound (B-1) is not more than 20% by mass, the storage stability is good.

The bisphenol A type epoxy resin (B-2) may have an epoxy equivalent of 100 to 1300 g/eq., preferably 200 to 600 g/eq. The content of the above bisphenol A type epoxy resin (B-2) in the amine-based curing agent (B) is within the range of 10 to 80% by mass, preferably 30 to 75% by mass, more preferably 40 to 70% by mass. When the content of bisphenol A type epoxy resin (B-2) is not less than 10% by mass, it is possible to ensure the adhesion. On the other hand, when the content of bisphenol A type epoxy resin (B-2) is not more than 80% by mass, it is possible to ensure the curability.

The above phenol novolac (B-3) may have a hydroxyl equivalent of 90 to 250 g/eq., preferably 95 to 150 g/eq. and may have a number average molecular weight of 190 to 5000, preferably 300 to 3000. The content of the phenol novolac (B-3) in the amine-based curing agent (B) is within the range of 5 to 50% by mass, preferably 10 to 35% by mass, more preferably 20 to 30% by mass. When the content of the phenol novolac (B-3) is not less than 5% by mass, it is possible to ensure the storage stability. On the other hand, when the content of the phenol novolac (B-3) is not more than 50% by mass, it is possible to ensure the curability.

In the epoxy resin-based curable composition of the present invention, the amine-based curing agent (B) is preferably an adduct reaction product of the amine compound (B-1) having the pyrazine ring and the bisphenol A type epoxy resin (B-2) which neutralized with the phenol novolac (B-3).

The amine-based curing agent (B) having the pyrazine ring in the curable composition of the present invention desirably has a pyrazine ring content of 1 to 15% by mass, preferably 2 to 9% by mass of the total mass of the amine-based curing agent (B) from the viewpoint of low-temperature curability. The pyrazine ring content was calculated by extracting the area ratio of the pyrazine ring absorption peak from the pyrolysis GC/MS measurements.

The amount of the amine-based curing agent (B) in the curable composition of the present invention is within the range of 0.5 to 20 parts by mass, preferably 1 to 10 parts by mass, based on 100 parts by mass of the epoxy resin from the viewpoint of low-temperature curability and storage stability of the epoxy resin.

It is desirable that the amine-based curing agent (B) has a melting point of 60 to 120° C., preferably 70 to 100° C., more preferably 75 to 90° C. When the melting point of the amine-based curing agent (B) is 60° C. or higher, it is possible to improve the storage stability of the epoxy resin-based curable composition obtained. On the other hand, when the melting point is 120° C. or lower, it is possible to improve the low-temperature curability of the epoxy resin-based curable composition obtained.

The epoxy resin-based curable composition of the present invention may contain a curing agent other than the amine-based curing agent (B) in order to improve the low-temperature curability, the storage stability and the adhesiveness in combination with the amine-based curing agent (B). Specific examples of such curing agents include dicyandiamide, 4,4'-diaminodiphenylsulfone, imidazole or derivative thereof (2-heptadecyl imidazole, etc.), dihydrazide derivatives, isophthalic acid dihydrazide, N, N'-dialkyl urea derivatives, N, N-dialkyl thiourea derivatives, melamine derivatives, microencapsulated amine-based latent curing agent, isocyanate-modified amine-based latent curing agent, and aliphatic-based latent curing agent. The amount of the curing agent other than the amine-based curing agent (B) in the curable composition of the present invention is within the range of preferably 0.1 to 20 parts by mass, more preferably 0.5 to 10 parts by mass, based on 100 parts by mass of the epoxy resin.

In the epoxy resin-based curable composition of the present invention, if necessary, plasticizers such as diisononyl phthalate, dioctyl phthalate, dibutyl phthalate, dilauryl phthalate, butyl benzyl phthalate, dioctyl adipate, diisodecyl adipate, trioctyl phosphate, tris (chloroethyl) phosphate, tris (dichloropropyl) phosphate, adipic acid-propylene glycol polyester, adipic acid-butylene glycol polyester, alkyl epoxy stearate, alkyl benzene, epoxidized soybean oil; fillers such as calcium oxide, calcium carbonate, wollastonite, carbon black, silica, clay, talc, titanium oxide, quick lime, kaolin, zeolite, diatomaceous earth; modifiers such as acrylic resin, anti-aging agents, antioxidants, ultraviolet absorbers, light-weight aggregate, pigments, rust inhibitors, anti-sagging agents, conductive fillers, surfactants and coupling agents such as silane-based coupling agent or titanium-based coupling agent; may be blended in a suitable amount as a usual additive.

It is desirable that a mass ratio (N B) of the urea-based curing accelerator (A) to the amine-based curing agent (B) having a pyrazine ring in the epoxy resin-based curable composition of the present invention is within the range of 0.1 to 10, preferably 0.2 to 5. When the mass ratio (A/B) is greater than or equal to 0.1, the epoxy resin-based curable composition has excellent low-temperature curability. On the other hand, when the mass ratio (A/B) is less than or equal to 10, the epoxy resin-based curable composition has excellent storage stability.

Curing conditions for the epoxy resin-based curable composition of the present invention varies depending on the type of the adherend and manufacturing process capability, but it is usually at 120 to 160° C. for 5 to 30 minutes.

With respect to the epoxy resin-based curable composition of the present invention, it is required to lower the curing temperature and shorten the curing time associated with the lowering of the baking temperature and shortening the baking time of the electrodeposition coating of automobile manufacturing line, respectively. In addition, the epoxy resin-based curable composition of the present invention may be used in a lower surrounding part of the automobile and part that steel sheets are overlapped, in which it is impossible to ensure sufficient curability. Particularly, the epoxy resin-based curable composition of the present invention has all of good low-temperature curability, good storage stability and good adhesion; and contributes to consideration of global environment and the reduction of the manufacturing cost.

EXAMPLES

The following Examples and Comparative Examples more specifically illustrate the present invention, but are not to be construed to limit the present invention thereby.

(Preparation of Latent Amine-Based Curing Agent A)

To a mixture of 75 g of methyl diaminopyrazine as an amine compound having a pyrazine ring and 125 g of diaminopropane, 500 g of "jER 828", which is commercially available from Mitsubishi Chemical Co., Ltd. as a bisphenol A type epoxy resin was added dropwise little by little at 110° C. for 180 minutes, and the mixture was then reacted while aging at 130° C. for 60 minutes to obtain an adduct reaction product (epoxy resin-amine adduct). Then, 250 g of phenol novolac (manufactured by Nippon Kayaku Co., Ltd., "KAYAHARD KTG-105", hydroxyl equivalent 105 g/eq. and a softening point of 103° C.) was added thereto, and the mixture was neutralized for 60 minutes at 180° C. to obtain a latent amine-based curing agent A having a pyrazine ring (Melting point 82° C.; pyrazine ring content of 8%).

(Preparation of Latent Amine-Based Curing Agent C)

To a mixture of 50 g of aminopyrazine as an amine compound having a pyrazine ring and 150 g of diaminopropane, 500 g of "jER 828", which is commercially available from Mitsubishi Chemical Co., Ltd. as a bisphenol A type epoxy resin was added dropwise little by little at 110° C. for 180 minutes, and the mixture was then reacted while aging at 130° C. for 60 minutes to obtain an adduct reaction product (epoxy resin-amine adduct). Then, 250 g of phenol novolac (manufactured by Nippon Kayaku Co., Ltd., "KAYAHARD KTG-105", hydroxyl equivalent 105 g/eq. and a softening point of 103° C.) was added thereto, and the mixture was neutralized for 60 minutes at 180° C. to obtain a latent amine-based curing agent C having a pyrazine ring (Melting point 80° C.; pyrazine ring content of 5%).

Examples 1 to 8 and Comparative Examples 1 to 7

The curable composition formulations shown in Table 1 and Table 2 below were mixed with a kneader, and were mixed with a triple roll mill two times, and were then agitated and degassed with the kneader again to prepare the epoxy resin-based curable composition for an adhesive.

TABLE 1

(parts by mass)

| Curable composition | | Example 1 | 2 | 3 | 4 | 5 | 6 | 7 | 8 |
|---|---|---|---|---|---|---|---|---|---|
| Bisphenol A type epoxy resin | *1 | 30 | 30 | 30 | 30 | 30 | 30 | 30 | 30 |
| CTBN-modified epoxy resin | *2 | 15 | 15 | 15 | 15 | 15 | 15 | 15 | 15 |
| Polypropylene glycol DGE | *3 | 10 | 10 | 10 | 10 | 10 | 10 | 10 | 10 |
| Dicyandiamide | | 3 | 3 | 3 | 3 | 3 | — | 3 | — |
| Diuron | *4 | 4 | 4 | 3 | 2 | 4 | 6 | 4 | 6 |
| Latent curing agent A | *5 | — | 4 | — | — | 2 | — | — | — |
| Latent curing agent B | *6 | 2 | — | 3 | 4 | — | 4 | — | — |
| Latent curing agent C | *7 | — | — | — | — | — | — | 4 | 4 |
| Latent curing agent D | *8 | — | — | — | — | 1 | — | — | — |
| Latent curing agent E | *9 | — | — | — | — | — | 1 | — | 1 |
| Latent curing agent F | *10 | — | — | — | — | — | — | — | — |
| Calcium oxide | | 2 | 2 | 2 | 2 | 2 | 2 | 2 | 2 |
| Wollastonite | *11 | 20 | 20 | 20 | 20 | 20 | 20 | 20 | 20 |
| Carbon black | | 8 | 8 | 8 | 8 | 8 | 8 | 8 | 8 |
| Calcium carbonate | *12 | 6 | 6 | 6 | 6 | 6 | 6 | 6 | 6 |
| Total | | 100 | 102 | 100 | 100 | 101 | 102 | 102 | 102 |

TABLE 2

(parts by mass)

| Curable composition | | Comparative Example 1 | 2 | 3 | 4 | 5 | 6 | 7 |
|---|---|---|---|---|---|---|---|---|
| Bisphenol A type epoxy resin | *1 | 30 | 30 | 30 | 30 | 30 | 30 | 30 |
| CTBN-modified epoxy resin | *2 | 15 | 15 | 15 | 15 | 15 | 15 | 15 |
| Polypropylene glycol DGE | *3 | 10 | 10 | 10 | 10 | 10 | 10 | 10 |
| Dicyandiamide | | 3 | 3 | 3 | 3 | 3 | 3 | 3 |
| Diuron | *4 | — | — | 4 | 8 | 4 | 4 | 4 |
| Latent curing agent A | *5 | — | — | — | — | — | — | — |
| Latent curing agent B | *6 | 4 | 8 | — | — | — | — | — |
| Latent curing agent C | *7 | — | — | — | — | — | — | — |
| Latent curing agent D | *8 | — | — | — | — | 2 | — | — |
| Latent curing agent E | *9 | — | — | — | — | — | 2 | — |
| Latent curing agent F | *10 | — | — | — | — | — | — | 2 |
| Calcium oxide | | 2 | 2 | 2 | 2 | 2 | 2 | 2 |
| Wollastonite | *11 | 20 | 20 | 20 | 20 | 20 | 20 | 20 |
| Carbon black | | 8 | 8 | 8 | 8 | 8 | 8 | 8 |
| Calcium carbonate | *12 | 6 | 6 | 6 | 6 | 6 | 6 | 6 |
| Total | | 98 | 102 | 98 | 102 | 100 | 100 | 100 |

(*1): Bisphenol A type epoxy resin, which is commercially available from Mitsubishi Chemical Corporation under the trade name "jER™ 828"

(*2) CTBN modified epoxy resin: Butadiene-acrylonitrile copolymer modified epoxy resin prepared by mixing carboxyl-terminated butadiene-acrylonitrile copolymer rubber ("Hycar™ CTBN 1300x8", which is commercially available from Noveon Inc.; 50% by mass) with bisphenol A type epoxy resin, which is commercially available from JER Co., Ltd. under the trade name "Epikote™ 828" and then reacting at 120° C. for 3 hours under the presence of a quaternary ammonium salt catalyst.

(*3): Polypropylene glycol diglycidyl ether, which is commercially available from Adeka Corporation under the trade name "Adeka Glycirol ED-506"

(*4) N, N-dimethyl-N'-(3,4-dichlorophenyl) urea (also referred to as "diuron"), which is commercially available from AlzChem Inc. under the trade name "Dyhard UR200".

(*5) Latent amine-based curing agent A having a pyrazine ring obtained by neutralizing amine adduct reaction product of amine having a pyrazine ring and bisphenol A type epoxy resin with phenol novolac (Melting point 82° C.; pyrazine ring content 8%)

(*6) Bisphenol A type epoxy resin-amine adduct, phenol-neutralized amine-based curing agent, which is commercially available from Adeka Corporation under the trade name "Adeka Hardner EH-5030S" (Melting point 80° C.).

(*7) Latent amine-based curing agent B having a pyrazine ring obtained by neutralizing amine adduct reaction product of amine having a pyrazine ring and bisphenol A type epoxy resin with phenol novolac (Melting point 80° C.; pyrazine ring content 5%)

(*8) Bisphenol A type epoxy resin-amine adduct, which is commercially available from Adeka Corporation under the trade name "Adeka Hardner EH-3731S" (Melting point about 90° C.)

(*9) Bisphenol A type epoxy resin-amine adduct, which is commercially available from Adeka Corporation under the trade name "Adeka Hardner EH-4358S" (Melting point about 95° C.)

(*10) 2-heptadecylimidazole, which is commercially available from Shikoku Chemicals Corporation under the trade name "Curezol C172" (Melting point 88° C.).

(*11) Wollastonite, which is commercially available from NYCO Minerals Inc. under the trade name "NYAD™ 325".

(*12) Surface-treated calcium carbonate, which is commercially available from Shiraishi Kogyo Kaisha, Ltd. under the trade name "Visco light SV".

(Evaluation of Physical Properties)

With respect to the resulting epoxy resin-based curable composition, the low-temperature curability, storage stability and adhesion were evaluated. The results are shown in Tables 3 and 4. The test methods are as follows.

(Test Method)

(1) Low Temperature Curability

The resulting epoxy resin-based curable compositions were cured by heating at 130° C. for 10 minutes, and then the curability of the compositions was evaluated by the following evaluation criteria.
  o: There is no uncured portion.
  x: There are uncured portions.

(2) Shear Adhesion

Cold rolled steel plates SPCC-SD (100 mm×25 mm×1.6 mm) as an adherend were bonded together by using the obtained epoxy resin-based curable composition, such that the adhesive area is 12.5 mm×25 mm (thickness of 0.2 mm), and then was cured by heating at 130° C. for 10 minutes to obtain a sample. The shear adhesion strength of the sample was measured at a tensile speed of 50 mm/min by using a tensile tester ("DSC-5000" from Shimadzu Corporation), and the shear strength was evaluated by the following evaluation criteria.
  o: Shear adhesion strength of not less than 5 MPa.
  x: Shear adhesion strength of less than 5 MPa.

(3) Storage Stability

With respect to the obtained compositions as shown in Tables 1 and 2, an initial viscosity $p_i$ [Pa·s] and a viscosity $p_{30}$ [Pa·s] after storage for 30 days at 40° C. were measured by using a pressure viscometer (JASO M323 viscosity test method B) under the following measurement conditions:
  Measurement temperature: 20° C.
  Shear rate: 15 sec$^{-1}$.

Rate of viscosity change was determined by the following formula:

Rate of viscosity change (%)=$(p_{30}-p_i)/p_i$ and the storage stability was evaluated by the following evaluation criteria:
  o: The rate of viscosity change is less than 50%, and the storage stability is good.
  x: The rate of viscosity change is 50% or more, or the occurrence of seeding is observed, and the storage stability is poor.

TABLE 3

| Evaluation result | Example | | | | | | | |
|---|---|---|---|---|---|---|---|---|
| | 1 | 2 | 3 | 4 | 5 | 6 | 7 | 8 |
| Low-temperature curability (at 130° C. for 10 minutes) | | | | | | | | |
| Curability | o | o | o | o | o | o | o | o |
| Shear adhesion | o | o | o | o | o | o | o | o |
| Storage stability | o | o | o | o | o | o | o | o |

TABLE 4

| Evaluation result | Comparative Example | | | | | | |
|---|---|---|---|---|---|---|---|
| | 1 | 2 | 3 | 4 | 5 | 6 | 7 |
| Low-temperature curability (at 130° C. for 10 minutes) | | | | | | | |
| Curability | x | x | x | o | o | o | o |
| Shear adhesion | x | x | x | o | x | o | o |
| Storage stability | o | o | o | x | x | x | x |

As is apparent from the results shown in Tables 3 and 4, in the epoxy resin-based curable compositions of Examples 1 to 8 of the present invention, all of the low-temperature curability and adhesion, and storage stability are good.

On the other hand, in the epoxy resin-based curable compositions of Comparative Examples 1 and 2, in which the amine-based curing agent (B) having a pyrazine ring is contained, but the urea-based curing accelerator (A) is not contained, the low-temperature curability and adhesion are very poor. Furthermore, in the epoxy resin-based curable composition of Comparative Example 3, in which the urea-based curing accelerator (A) is contained, but the amine-based curing agent (B) having a pyrazine ring is not contained, the storage stability is good, but the low-temperature curability and adhesion are very poor. In the epoxy resin-based curable composition of Comparative Example 4, in which the amount of the urea-based curing accelerator (A) is increased as compared with that of the epoxy resin-based curable composition of Comparative Example 3, the low-temperature curability and adhesion are good, but the storage stability is very poor.

Furthermore, in the epoxy resin-based curable compositions of Comparative Examples 5 and 6 containing the amine-based curing agent which is epoxy resin-amine adduct, but has no pyrazine ring, the low-temperature curability is good, but the storage stability is very poor. In the epoxy resin-based curable composition of Comparative Examples 7 containing 2-heptadecylimidazole as a general latent curing agent instead of the amine-based curing agent (B) having a pyrazine ring, the low-temperature curability and adhesion are good, but the storage stability is very poor.

What is claimed is:

1. A curable composition comprising an epoxy resin, a urea-based curing accelerator (A) and an amine-based curing agent (B) having a pyrazine ring, wherein the amine-based curing agent (B) having a pyrazine ring comprises:
   (i) an adduct reaction product of an amine compound (B-1) having the pyrazine ring and a bisphenol A type epoxy resin (B-2); and
   (ii) a phenol novolac (B-3), and
   wherein the amine-based curing agent (B) has a melting point of 60 to 120° C.

2. The curable composition according to claim 1, wherein the urea-based curing accelerator (A) is N, N-dimethyl-N'-(3, 4-dichlorophenyl) urea.

3. The curable composition according to claim 1, wherein the amine compound (B-1) having a pyrazine ring has a content of 1 to 20% by mass, based on the mass of the amine-based curing agent (B) having a pyrazine ring.

4. The curable composition according to claim 1, wherein a mass ratio (A/B) of the urea-based curing accelerator (A) to the amine-based curing agent (B) having a pyrazine ring in the curable composition is within the range of 0.1 to 10.

* * * * *